United States Patent Office 2,991,167
Patented July 4, 1961

2,991,167
SOLID ROCKET PROPELLANT COMPOSITIONS
Joe M. Burton, McGregor, Tex., assignor to Phillips Petroleum Company, a corporation of Delaware
No Drawing. Filed Feb. 17, 1956, Ser. No. 566,103
8 Claims. (Cl. 52—.5)

This invention relates to solid rocket propellants. In one aspect, the invention relates to propellant compositions having improved physical and ballistic properties.

In recent years, considerable work has been directed toward the development of solid propellants suitable for use in rocket motors. Rockets employing solid propellant fuels are extensively used by the military and have also achieved considerable importance in commercial operations. For example, solid rocket propellants are utilized in missiles, projectiles, and rockets to assist planes in take-off or to furnish an extra surge of power in flight. A solid propellant to be satisfactory for its intended use should possess certain desirable physical characteristics, for example, the propellant should have a high tensile strength and a high modulus of elasticity. Furthermore, it would be especially desirable to provide a propellant which can be readily adapted without exhaustive tests to form slow, intermediate, or fast burning rocket grains.

It is an object of this invention, therefore, to provide new and improved solid rocket propellants.

Another object of the invention is to provide propellant compositions having improved physical and ballistic properties.

Still another object of the invention is to provide a propellant composition which can be readily varied to form slow, inteermediate or fast burning rocket grains.

A further object of the invention is to provide an improved reinforcing agent for use in propellant compositions comprising an oxidant and a polymeric binder.

Other and further objects of the invention will become apparent to one skilled in the art upon consideration of the following disclosure.

Recently, superior solid propellant materials have been discovered which comprise a solid oxidant, such as ammonium nitrate or ammonium perchlorate, and a rubbery material, such as a copolymer of butadiene and a vinyl-pyridine or other substituted heterocyclic nitrogen base compound, which after incorporation is cured by a quaternization reaction or a vulcanization reaction. Solid propellant mixtures of this nature and a process for their production are disclosed and claimed in copending application, Serial No. 284,447, filed April 25, 1952, by W. B. Reynolds and J. E. Pritchard.

This invention is particularly applicable to rocket propellants of the type described in the preceding paragraph. In such propellant compositions, it is customary to utilize a reinforcing agent such as carbon black. I have now discovered that by utilizing silica in addition to the conventional reinforcing agents it is possible to obtain a solid propellant having improved physical characteristics. Furthermore, I have found that by varying the amount of silica in the propellant composition, the burning rate of the propellant can be varied without materially affecting the ignitability of the propellant. Thus, it is possible to provide a versatile propellant formulation which can be readily adapted to form rocket grains which burn at different burning rates.

Broadly speaking, the present invention resides in the improvement in using silica as a reinforcing agent in rocket propellant compositions comprising a solid oxidant and a polymeric material. In a more specific embodiment, the invention lies in using silica and carbon black as reinforcing agents in a propellant composition comprising a solid inorganic oxidizing salt and a copolymer of (1) a polymerizable heterocyclic nitrogen base having a

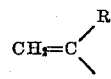

group attached to a nuclear carbon atom where R' is selected from the group consisting of hydrogen and a methyl radical, and (2) a conjugated diene. While the silica and carbon black have been designated as reinforcing agents in order to identify the primary function of these materials in the propellant composition, it is to be understood that the materials may in addition perform other functions as well.

The silica used in the propellant composition of this invention is preferably in the form of a finely divided gel. A suitable silica gel is one having an ultimate particle size between 10 and 20 millimicrons which has been treated so as to form by agglomeration discrete, amorphous particles in the 80 to 400 mesh range. The amount of silica gel and carbon black employed in the propellant composition is usually in the range of 1 to 20 parts of silica per 100 parts of rubbery copolymer and from 10 to 30 parts of carbon black per 100 parts of rubbery copolymer. It is to be understood that the silica can constitute a major proportion of the total amount of reinforcing agents used in the composition.

The rubbery polymers employed as binders in the solid propellant compositions of this invention are copolymers of conjugated dienes with polymerizable heterocyclic nitrogen bases of the pyridine series. These copolymers can vary in consistency from very soft rubbers, i.e., materials which are soft at room temperature but will show retraction when relaxed, to those having a Mooney value (ML-4) up to 100. The rubbery copolymers most frequently preferred have Mooney values in the range between 10 and 40. They may be prepared by any polymerization methods known to the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar-free or containing sugar, the sulfoxylate, and the persulfate recipes are among those which are applicable. It is advantageous to polymerize to high conversion as the unreacted vinyl-pyridine monomer is difficult to remove by stripping.

The conjugated dienes employed are those containing from 4 to 8 carbon atoms per molecule and include 1,3-butadiene, isoprene, 2-methyl-1,3-butadiene, 2,3-dimethyl-1,3-butadiene, 2-methoxybutadiene, 2-phenylbutadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable in the preparation of the polymeric binders of this invention. Furthermore, instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of the pyridine, quinoline, and isoquinoline series which are copolymerizable with a conjugated diene and contain one, and only one,

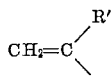

substituent wherein R' is either hydrogen or a methyl group. That is, the substituent is either a vinyl or an alpha-methylvinyl (isopropenyl) group. Of these, the compounds of the pyridine series are at present of the greatest interest commercially. Various substituted derivatives are also applicable but the total number of carbon atoms in the groups attached to the carbon atoms of the heterocyclic nucleus should not be greater than 15 because the polymerization rate decreases somewhat with increasing size of the alkyl group. Compounds where the alkyl substituents are methyl and/or ethyl are available commercially.

These heterocyclic nitrogen bases have the formula

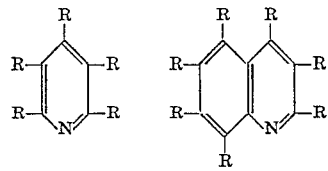

or

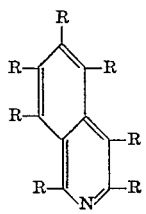

where R is selected from the group consisting of hydrogen, alkyl, vinyl alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4 - phenoxy-5-methylpyridine; 2-cyano-5-(alpha-methylvinyl)pyridine; 3-vinyl-5-phenylpyridine; 2-(para-methylphenyl) - 3-vinyl-4-methylpyridine; 3-vinyl-5-(hydroxyphenyl)-pyridine; 2-vinylquinoline; 2-vinyl-4-ethylquinoline; 3-vinyl-6,7-di-n-propylquinoline; 2-methyl-4-nonyl-6-vinylquinoline; 4(alpha-methylvinyl) - 8-dodecylquinoline; 3-vinylisoquinoline; 1,6-dimethyl-3-vinyl-isoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

Oxidants which are applicable in the solid propellant compositions of this invention include ammonium, alkali metal, and alkaline earth metal salts of nitric, perchloric, and chloric acids, and mixtures thereof. Ammonium nitrate and ammonium perchlorate are the preferred oxidants for use in the solid rocket fuels of this invention. Specific oxidants include sodium nitrate, potassium perchlorate, lithium chlorate, calcium nitrate, barium perchlorate, and strontium chlorate. Mixtures of oxidants are also applicable. In the preparation of the solid rocket propellant compositions, the oxidants are powdered to sizes preferably finer than 200 mesh. The amount of solid oxidant employed is usually a major amount of the total composition and is generally in the range between about 165 and 980 parts of oxidant per 100 parts of copolymer. However, it is preferred to use between 750 and 900 parts of oxidant per 100 parts of copolymer.

The propellant composition in addition to the binder and oxidant usually contains a suitable combustion or burning rate catalyst such as metal ferrocyanides and ferricyanides. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is Milori blue which is a pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used in the propellant compositions of this invention is usually in the range of 1 to 60 parts per 100 parts of rubbery polymer with from 15 to 30 parts being most frequently preferred.

The binder, in addition to the rubbery copolymer of the type described hereinabove and the reinforcing agents of this invention, may include also such materials as plasticizers, wetting agents, and antioxidants. Other ingredients which are employed for sulfur vulcanization include a vulcanization accelerator, a vulcanizing agent, such as sulfur, and an accelerator activator, such as magnesium or zinc oxide.

The copolymer comprising a conjugated diene and a polymerizable heterocyclic nitrogen base can also be cured by a quaternization reaction by incorporating therein a quaternizing agent and subjecting the resulting mixture to quaternizing conditions of temperature. The quaternizing temperature is usually in the range of 0 to 175° C., although temperatures outside of this range can be employed. Suitable quaternizing agents include alkyl halides, such as methyl iodide, methyl bromide; alkylene halides, such as methylene iodide and ethylene bromide; substituted alkanes, such as chloroform and bromoform; alkyl sulfates such as methyl sulfate; and various substituted aromatic compounds such as benzoyl chloride, methyl benzene sulfonate, and the like.

A general formulation for a binder composition prepared by sulfur vulcanization is set forth below.

| Ingredient: | Parts per 100 parts of copolymer |
|---|---|
| Copolymer | 100 |
| Carbon black | 10–30 |
| Plasticizer | 10–30 |
| Oxidant | 165–980 |
| Silica | 1–20 |
| Combustion catalyst | 15–30 |
| Metal oxide | 0–5 |
| Antioxidant | 0–5 |
| Wetting agent | 0–2 |
| Accelerator | 0–2 |
| Curing agent | 0–2 |

In general, any suitable rubber plasticizer can be employed in these binder compositions. Materials such as Pentaryl A (amylbiphenyl), ParaFlux (saturated polymerized hydrocarbon), Circosol–2XH (petroleum hydrocarbon softener having a specific gravity of 0.940 and a Saybolt Universal viscosity at 100° F. of about 2000 seconds), di-butoxyethoxyethyl formal, and dioctyl phthalate are suitable plasticizers. Materials which provide rubber having good low temperature properties are preferred. It is also frequently preferred that the plasticizers be oxygen-containing materials.

Wetting agents aid in deflocculating or dispersing the oxidizer. Aerosol OT (dioctyl ester of sodium sulfosuccinic acid), lecithin, and Duomeen C diacetate (reaction product of acetic acid with the mono-salt formed from trimethylene diamine and coconut oil acid) are among the materials which can be employed.

Antioxidants include Flexamine (physical mixture containing 25 percent of a complex diarylamine-ketone reaction product and 35 percent of N,N'-diphenyl-p-phenylenediamine), phenyl-beta-naphthylamine, 2,2-methylene-bis(4-methyl-6-tert-butylphenol), and the like. Rubber antioxidants, in general, may be employed, or, if desired, they may be omitted.

Examples of vulcanization accelerators include those of the carbamate type, such as N,N-dimethyl-S-tert-butylsulfenyl dithiocarbamate and Butyl-Eight. Butyl-Eight is a rubber accelerator of the dithiocarbamate type supplied by the R. T. Vanderbilt Company and described in "Handbook of Material Trade Names" by Zimmerman and Lavine, 1953 edition, as a brown liquid; specific gravity 1.01; partially soluble in water and gasoline; and soluble in acetone, alcohol, benzol, carbon disulfide and chloroform.

It is to be understood that each of the various types of compounding ingredients may be used singly or mixtures of various ingredients performing a certain function may be employed. For example, it is sometimes preferred to use mixtures of plasticizers rather than a single material. It is to be understood also that the various compounding ingredients perform other functions in the propellant composition as well as the principal function as indicated by the term used to describe the various ingredients.

The various ingredients in the propellant composition may be mixed on a roll mill or an internal mixer such as a Banbury or a Baker-Perkins dispersion blade mixer may be employed. The binder forms a continuous phase in the propellant with the oxidant as the discontinuous phase. Rocket grains are formed by compression molding, injection molding, or extrusion. The curing temperature will be limited by the oxidizer employed in some cases but will generally be in the range between 70 and 250° F., preferably between 140 and 180° F. The curing time must be long enough to give required creep resistance and other mechanical properties in the propellant. The time will generally range from around three hours when the higher curing temperatures are employed to about 28 days when curing is effected at lower temperatures.

While this invention has been described using a binder composition comprising a copolymer of a conjugated diene with a polymerizable heterocyclic nitrogen base of the pyridine series, such as vinylpyridine and various alkyl-substituted derivatives, it is to be understood that the corresponding quinoline and isoquinoline compounds are also applicable, i.e., vinylquinolines, vinylisoquinolines and various alkyl-substituted derivatives of these compounds.

A more complete understanding of the invention can be obtained by referring to the following illustrative example which is not intended, however, to be unduly limitative of the invention.

EXAMPLE

Three solid propellants were prepared which had the following compositions:

|  | Parts per 100 parts copolymer | | |
|---|---|---|---|
|  | 1 | 2 | 3 |
| Butadiene/2-methyl-5-vinylpyridine copolymer | 100 | 100 | 100 |
| Carbon black | 20 | 20 | 20 |
| Silica gel (400 mesh) | 0 | 1 | 3 |
| Ammonium nitrate | 753 | 758 | 768 |
| Dibutoxyethoxyethyl formal | 20 | 20 | 20 |
| Milori blue | 18 | 18 | 18 |
| Zinc oxide | 3 | 3 | 3 |
| Flexamine [1] | 3 | 3 | 3 |
| Aerosol-OT [2] | 1 | 1 | 1 |
| Sulfur | 0.75 | 0.75 | 0.75 |
| SA–113 [3] | 1 | 1 | 1 |

[1] Physical mixture containing 25 percent of a complex diarylamine-ketone reaction product and 35 percent of N,N'-diphenyl-p-phenylenediamine.
[2] Dioctyl ester of sodium sulfosuccinic acid.
[3] N,N-dimethyl-tertiary butyl sulfenyl dithiocarbamate.

The various ingredients making up the solid propellants were thoroughly mixed in a suitable mixer with the binder which formed the continuous phase in the final composition. Material from each of the three compositions was extruded into a sheet 0.25 inch in thickness from which tensile specimens were stamped out prior to curing. The specimens were cured at 170° F. for one or two weeks, as indicated in the table, and then tested to determine their mechanical and ballistic properties. The results of these tests are presented below in the table.

*Table*

Mechanical properties at 70° F., 3 in./sec. cross arm speed.
Ballistic properties at 70° F., 1,000 p.s.i.

|  | 1 | 2 | 3 |
|---|---|---|---|
| Tensile strength, p.s.i.: |  |  |  |
| 1 week | 260 | 300 | 320 |
| 2 weeks | 330 | 440 | 420 |
| Ultimate elongation, percent: |  |  |  |
| 1 week | 11.0 | 16.7 | 13.2 |
| 2 weeks | 12.0 | 9.1 | 7.7 |
| Modulus of elasticity, p.s.i.: |  |  |  |
| 1 week | 3,000 | 2,900 | 4,700 |
| 2 weeks | 1,400 | 9,600 | 11,000 |
| Burning rate, $r_{1000}$, in./sec. | 0.165 | 0.161 | 0.145 |
| $n$ (pressure exponent) | 0.53 | 0.53 | 0.53 |

$n$ is defined by the formulas $$r = AP^n; \quad \frac{r_1}{r_2} = \frac{AP_1^n}{AP_2^n}; \quad r_1 = r_2 \frac{(P_1)^n}{(P_2)^n}; \quad r = r_{1000} \frac{(P_1)^n}{(1000)^n}$$

$r$ = rate in./sec. at pressure P
$P$ = pressure of chamber, p.s.i.g.
$r_{1000}$ = burning rate at the reference pressure of 1000 p.s.i.g.

From a consideration of the data in the table, it is seen that the addition of silica to the propellant composition results in improvements in the physical properties of the propellant. Thus, the propellant compositions containing silica have a higher tensile strength and an increased modulus of elasticity. It is important that the propellant have a high tensile strength in order to offer great resistance to stresses which may cause the propellant to fracture. Such stresses may be set up, for example, during take-off of a rocket motor or as a result of temperature cycling occuring during the production process or under changing conditions of storage. An increased modulus of elasticity is important because of the greater dimensional stability and increased resistance to slump or creep which are thereby imparted to the propellant. It is noted further from the table that the addition of the silica to the propellant compositions depresses the burning rate without affecting the pressure exponent. In other words, by varying the amount of silica used, it is possible to obtain slow,

I claim:

1. A solid composition useful as a rocket fuel consisting essentially of a copolymer of a conjugated diene containing from 4 to 8 carbon atoms per molecule with vinylpyridine, from about 165 to about 980 parts by weight per 100 parts by weight of said copolymer of ammonium nitrate, from about 10 to about 30 parts by weight per 100 parts by weight of said copolymer of carbon black, and from about 1 to about 20 parts by weight per 100 parts by weight of said copolymer of silica gel.

2. A solid composition useful as a rocket fuel comprising a major proportion of an inorganic oxidizing salt; a minor proportion of a copolymer of (a) a conjugated diene containing from 4 to 8 carbon atoms per molecule and (b) a

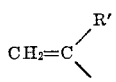

substituted heterocyclic nitrogen base selected from the group consisting of pyridine, quinoline, alkyl substituted pyridine, and alkyl substituted quinoline, wherein the total number of carbon atoms in the nuclear alkyl substituents is not more than 15 and wherein R' is selected from the group consisting of hydrogen and a methyl radical; from about 10 to about 30 parts by weight per 100 parts by weight of said copolymer of carbon black; and from about 1 to about 20 parts by weight per 100 parts by weight of said copolymer of silica gel.

3. The propellant composition of claim 2 wherein said inorganic oxidizing salt is ammonium nitrate and said copolymer is a copolymer of 1,3-butadiene and 2-methyl-5-vinylpyridine.

4. A solid composition useful as a rocket fuel consisting essentially of a binder comprising a copolymer of (a) a conjugated diene containing from 4 to 8 carbon atoms per molecule and (b) a

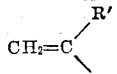

substituted heterocyclic nitrogen base selected from the group consisting of pyridine, quinoline, alkyl substituted pyridine, and alkyl substituted quinoline, wherein the total number of carbon atoms in the nuclear alkyl substituents is not more than 15 and wherein R' is selected from the group consisting of hydrogen and a methyl radical; from about 165 to about 980 parts by weight per 100 parts by weight of said copolymer of an inorganic oxidizing salt; from about 10 to about 30 parts by weight per 100 parts by weight of said copolymer of carbon black; and from about 1 to about 20 parts by weight per 10 parts by weight of said copolymer of silica gel.

5. In a solid composition useful as a rocket fuel comprising a solid inorganic oxidizing salt and a copolymer of a

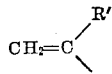

substituted heterocyclic nitrogen base selected from the group consisting of pyridine, quinoline, alkyl substituted pyridine, and alkyl substituted quinoline, wherein the total number of carbon atoms in the nuclear alkyl substituents is not more than 15 and wherein R' is selected from the group consisting of hydrogen and a methyl radical, and a conjugated diene containing from 4 to 8 carbon atoms per molecule, the improvement characterized by the presence in said composition of from about 10 to about 30 parts by weight per 100 parts by weight of said copolymer of carbon black and from about 1 to about 20 parts by weight per 100 parts by weight of said copolymer of silica gel.

6. A solid composition useful as a rocket fuel consisting essentially of a copolymer of (a) a conjugated diene containing from 4 to 8 carbon atoms per molecule and (b) a

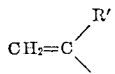

substituted heterocyclic nitrogen base selected from the group consisting of pyridine, quinoline, alkyl substituted pyridine, and alkyl substituted quinoline, wherein the total number of carbon atoms in the nuclear alkyl substituents is not more than 15 and wherein R' is selected from the group consisting of hydrogen and a methyl radical, and, per 100 parts by weight of said copolymer, the following ingredients in parts by weight

| | |
|---|---|
| Carbon black | 10–30 |
| Plasticizer | 10–30 |
| Oxidant | 165–980 |
| Silica | 1–20 |
| Combustion catalyst | 1–60 |
| Accelerator activator | 0–5 |
| Antioxidant | 0–5 |
| Wetting agent | 0–2 |
| Accelerator | 0–2 |
| Curing agent | 0–2 |

7. A solid composition useful as a rocket fuel consisting essentially of a copolymer of (a) a conjugated diene containing from 4 to 8 carbon atoms per molecule and (b) a

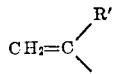

substituted heterocyclic nitrogen base selected from the group consisting of pyridine, quinoline, alkyl substituted pyridine, and alkyl substituted quinoline, wherein the total number of carbon atoms in the nuclear alkyl substituents is not more than 15 and wherein R' is selected from the group consisting of hydrogen and a methyl radical; from about 165 to about 980 parts by weight per 100 parts by weight of said copolymer of an inorganic oxidizing salt; from about 10 to about 30 parts by weight per 100 parts by weight of said copolymer of carbon black; and from about 1 to about 20 parts by weight per 100 parts by weight of said copolymer of silica gel.

8. A solid composition useful as a rocket fuel comprising (1) an inorganic oxidizing salt as its major component; (2) as a minor component a copolymer of (a) a conjugated diene containing from 4 to 8 carbon atoms per molecule and (b) a

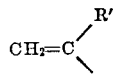

substituted heterocyclic nitrogen base selected from the group consisting of pyridine, quinoline, alkyl substituted pyridine and alkyl substituted quinoline, wherein the total number of carbon atoms in the nuclear alkyl substituents is not more than 15 and wherein R' is selected from the group consisting of hydrogen and a methyl radical; and (3) as minor components carbon black and silica.

No references cited.

UNITED STATES PATENT OFFICE
CERTIFICATE OF CORRECTION

Patent No. 2,991,167                                                  July 4, 1961

Joe M. Burton

It is hereby certified that error appears in the above numbered patent requiring correction and that the said Letters Patent should read as corrected below.

Column 7, line 59, for "10" read -- 100 --.

Signed and sealed this 28th day of November 1961.

(SEAL)
Attest:

ERNEST W. SWIDER                                        DAVID L. LADD
Attesting Officer                                         Commissioner of Patents
                                                                                              USCOMM-DC